(12) United States Patent
Iossifidis (10) Patent No.: US 10,668,844 B2
(45) Date of Patent: Jun. 2, 2020

(54) EXTENSION ASSIST FOR HEADREST

(71) Applicant: Rockwell Collins, Inc., Cedar Rapids, IA (US)

(72) Inventor: John Iossifidis, Miami, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/128,749

(22) Filed: Sep. 12, 2018

(65) Prior Publication Data

US 2020/0079261 A1    Mar. 12, 2020

(51) Int. Cl.
*B64D 11/06* (2006.01)
*B60N 2/829* (2018.01)

(52) U.S. Cl.
CPC .......... *B60N 2/829* (2018.02); *B64D 11/0642* (2014.12)

(58) Field of Classification Search
CPC ........ B60N 2/818; B60N 2/826; B60N 2/824; B60N 2/829; B60N 2/809; B64D 11/0642
USPC ........ 297/410, 404, 411.36, 258.1, 274, 332, 297/DIG. 10
See application file for complete search history.

(56) References Cited

U.S. PATENT DOCUMENTS

| 4,822,102 | A | * | 4/1989 | Duvenkamp | B60N 2/874 297/403 |
| 5,316,370 | A | * | 5/1994 | Newman | A61G 5/14 297/313 |
| 5,823,619 | A | * | 10/1998 | Heilig | B60N 2/853 297/216.12 |

FOREIGN PATENT DOCUMENTS

| DE | 202013009391 U1 | 4/2014 | |
| EP | 1602527 A2 | 12/2005 | |
| FR | 1522431 A * | 4/1968 | ............ B60N 2/809 |
| FR | 2937007 A1 | 4/2010 | |

OTHER PUBLICATIONS

Extended Search Report dated Feb. 21, 2020 for EP Application No. 19194112.9.

* cited by examiner

*Primary Examiner* — Milton Nelson, Jr.
(74) *Attorney, Agent, or Firm* — Suiter Swantz pc llo (57) ABSTRACT

A headrest extension assist system is disclosed. In embodiments, a headrest extension assist system includes a headrest extension assembly movably coupled to a backrest assembly. The headrest extension assist system may further include an extension assist assembly. The extension assist assembly may be coupled to the headrest extension assembly at one end, and a fixed point relative to the headrest extension assembly at another end. The extension assist assembly exerts an extension force on the headrest extension assembly to offset, or partially offset, an extension resistance force. The extension assist assembly exerts the extension force to extend the headrest extension assembly to at least one of a retracted position, an intermediate position, and an extended position.

20 Claims, 9 Drawing Sheets

EXTENSION ASSIST FOR HEADREST

CROSS-REFERENCE TO RELATED APPLICATIONS

The present application is related to U.S. Pat. No. 10,589,649 entitled "LINKAGE EXTENSION SYSTEM WITH DAMPED MOTION" issued Mar. 17, 2020, and U.S. Pat. No. 10,611,283 entitled "MULTI-STAGE SEATBACK EXTENSION SYSTEM" issued Apr. 7, 2020, both of which are incorporated herein by reference in their entirety.

BACKGROUND

Many aircraft and other vehicles are being built with smaller, shorter seat backrests for vehicle occupants. In order to support the head, neck, and back of vehicle occupants in seats with shorter backrests, headrest extension assemblies may be advantageous. The added support of headrest extension assemblies becomes increasingly important in emergency situations, such as crashes, where supporting the head and neck of vehicle occupants is of utmost importance. However, as seat backrests become shorter, headrest extension assemblies become larger and heavier. Increasingly heavy headrest extension assemblies may be difficult for vehicle occupants to move and adjust, particularly from a seated position. Consequently, there is a need in the art for headrest and/or backrest assemblies that cure one or more shortfalls identified above.

SUMMARY

In one aspect, embodiments of the inventive concepts disclosed herein are directed to an extension assist system. In embodiments, the system includes a headrest extension assembly. The headrest extension assembly includes a headrest and one or more extension members movably coupled to a backrest assembly of a seat, and is configured to translate along a movement axis between at least a retracted position and an extended position. The system also includes an extension assist assembly configured to exert an extension force parallel to the movement axis, wherein the extension force is less than an extension resistance force acting parallel to the movement axis in a direction opposite the extension force.

In another aspect, embodiments of the inventive concepts disclosed herein are directed to an extension assist system. In embodiments, the system includes an extension assembly and an extension assist assembly. The extension assembly is configured to translate along a movement axis between at least a retracted position and an extended position. The extension assist assembly includes an extension panel and one or more extension members movably connected to a body assembly, and is configured to exert an extension force parallel to the movement axis, wherein the extension force is less than an extension resistance force acting parallel to the movement axis in a direction opposite the extension force.

In another aspect, embodiments of the inventive concepts disclosed herein are directed to an extension assist assembly. In embodiments, the assembly includes a gas spring assembly configured to exert an extension force to translate a headrest extension assembly along a movement axis between at least a retracted position and an extended position.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, directional terms such as "top," "bottom," "over," "under," "upper," "upward," "lower," "down," "downward," and similar terms, are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Additionally, as used herein, a letter following a reference numeral is intended to reference an embodiment of the feature or element that may be similar, but not necessarily identical, to a previously described element or feature bearing the same reference numeral (e.g., 1, 1A, 1B). Such shorthand notations are used for purposes of convenience only, and should not be construed to limit the inventive concepts disclosed herein in any way unless expressly stated to the contrary.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an extension assist system for headrests and/or backrests. Additional embodiments of the present disclosure are directed to the use of an extension assist assembly to counter-balance the weight of a headrest extension assembly, thereby allowing for easier movement of the headrest extension assembly. Additional embodiments of the present disclosure are directed to the use of an extension assist assembly configured to dampen the motion of a headrest extension assembly relative to a backrest assembly. In addition to facilitating smooth, luxurious extension and retraction of the headrest extension assembly, the assisted motion of the headrest extension assembly may provide added support and comfort for seat occupants.

It is recognized herein that headrest extension assemblies may be required in some aircraft and other vehicles with shorter seat backrests in order to support the head, neck, and back of vehicle occupants. However, as headrest extension assemblies become larger, they often become heavier and increasingly difficult for vehicle occupants to move and adjust, particularly from a seated position. Specifically, the force required to adjust heavy headrest extension assemblies may be awkward, difficult, or even impossible to achieve from a seated position. As such, embodiments of the inventive concepts disclosed herein may facilitate the movement of headrest and/or backrest extension assemblies for easier, smoother adjustment.

Referring generally to FIGS. 1A-5, systems and apparatuses for headrest extension assistance are shown and described, in accordance with one or more embodiments of the present disclosure.

As noted previously herein, the inventive concepts of the present disclosure may be incorporated in the seats of an aircraft in order to facilitate the movement of the headrests on the seats of the aircraft. Using the inventive concepts disclosed herein, aircraft passengers may be able to quickly and easily adjust the headrests of their seats from both a standing and seated position.

Although example embodiments of the present disclosure are shown and described in an aviation environment, the inventive concepts of the present disclosure may be configured to operate in any type of seat and/or vehicle known in the art. For example, the embodiments of the present disclosure may be incorporated into the seats of any air, land, or water-based personal equipment or vehicle; any air, land, or water-based commercial equipment or vehicle; any air, land, or water-based military equipment or vehicle known in the art. In another example, embodiments of the present disclosure may be incorporated into the seat of an automobile. In the interest of simplicity and to most clearly define the inventive concepts of the present disclosure, embodiments may be described throughout the present disclosure in an aircraft environment. However, these references are not to be regarded as limiting. Thus, references to "aircraft," "airplanes," "avionics," and like terms should not be interpreted as a limitation on the present disclosure, unless noted otherwise herein.

Figure 1A:
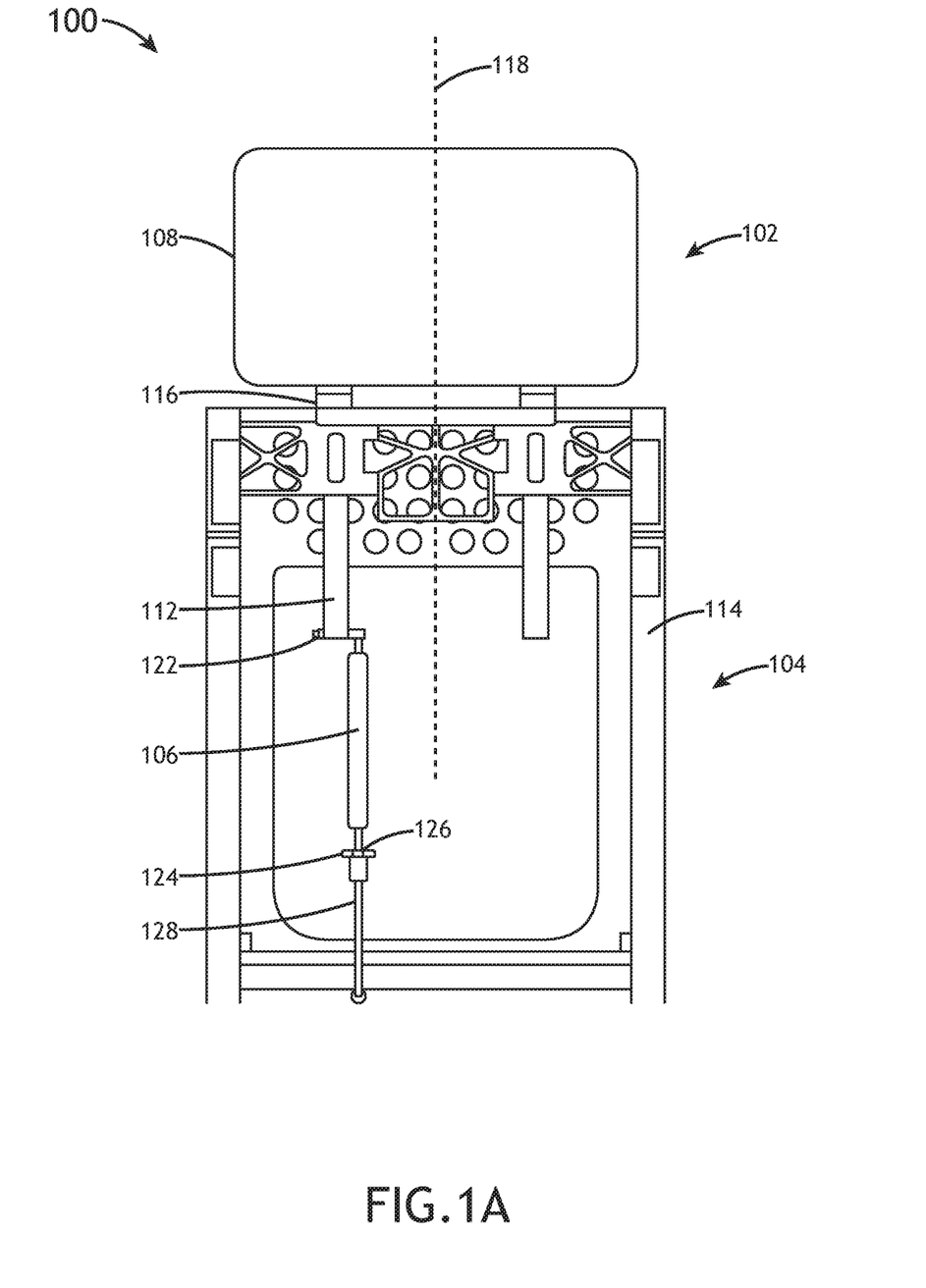
FIG. 1A illustrates a rear view of an extension assist system in a retracted position, in accordance with an example embodiment of the present disclosure.

FIG. 1A illustrates a rear view of an extension assist system 100 in a retracted position, in accordance with one or more embodiments of the present disclosure. As shown in FIG. 1A, extension assist system 100 ("system 100") may include a headrest extension assembly 102, a backrest assembly 104, and an extension assist assembly 106.

The seat of an aircraft may include, among other elements, a headrest extension assembly 102 and a backrest assembly 104. The headrest extension assembly 102 may include a headrest 108 and one or more extension members 112. Similarly, the backrest assembly 104 may include a backrest frame 114 and one or more ports 116. In an embodiment, the headrest extension assembly 102 is configured to be movably coupled to the backrest assembly 104. For example, the one or more extension members 112 of the headrest extension assembly 102 may be configured to slidingly couple with the backrest assembly 104 via the one or more ports 116. In this example, the one or more extension members 112 may slide "up" and "down" as depicted in FIG. 1A, within the one or more ports 116 of the backrest assembly 104. The one or more ports 116 may include any ports or components known in the art including, but not limited to, one or more gaskets, one or more sleeves, and the like.

Figure 1B:
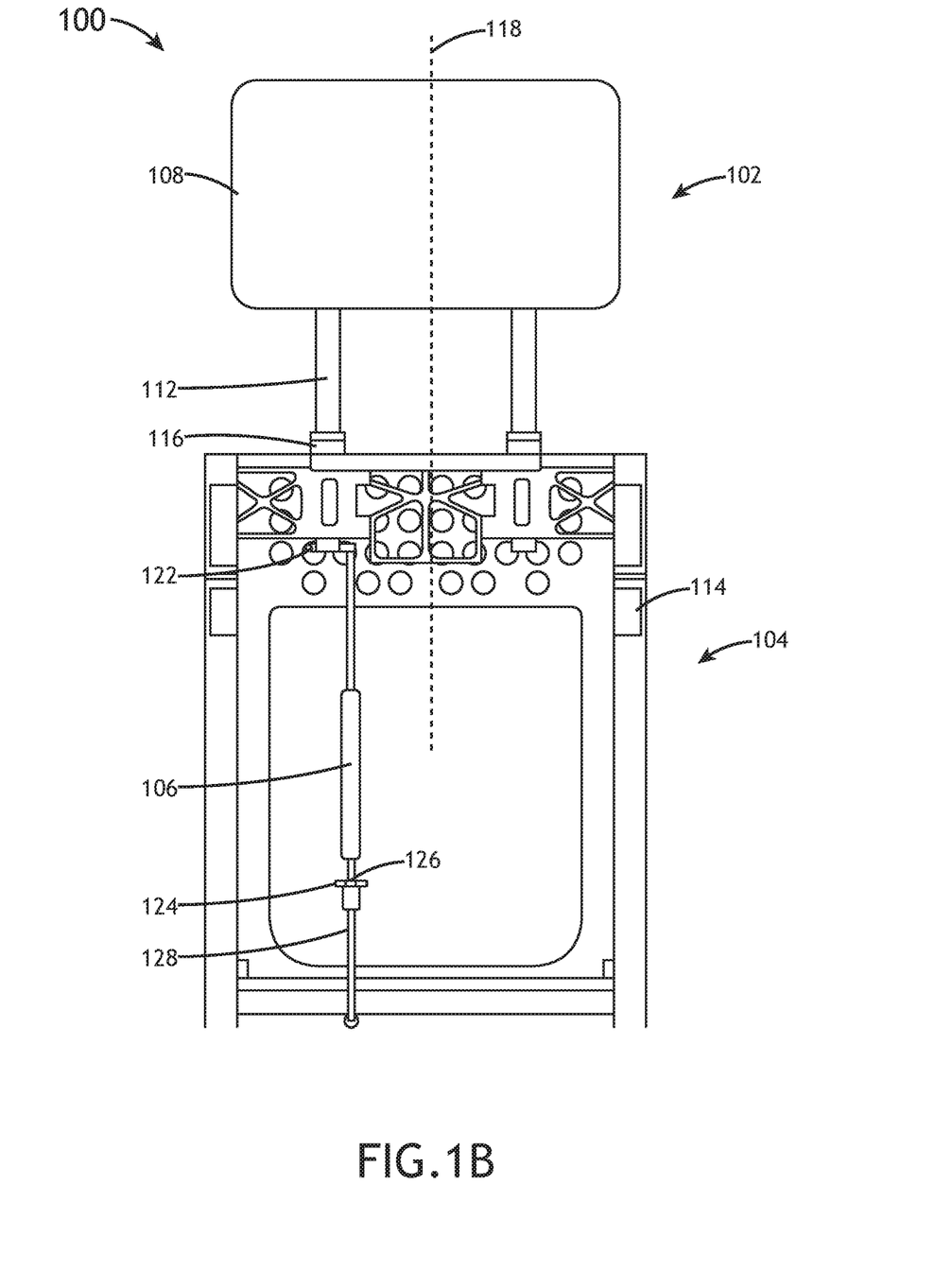
FIG. 1B illustrates a rear view of an extension assist system in an extended position, in accordance with an example embodiment of the present disclosure.

The headrest extension assembly 102 may be movably coupled to backrest assembly 104 such that headrest extension assembly 102 is configured to translate along a movement axis 118. The headrest extension assembly 102 may be configured to translate along the movement axis 118 to any number of positions including, but not limited to, a retracted position (as shown in FIG. 1A), an intermediate position, and an extended position (as shown in FIG. 1B, described in greater detail herein). In another example, the headrest extension assembly 102 may be translated along movement axis 118 in an infinite number of positions. In this regard, system 100 may provide for greater flexibility in adjusting the position of the headrest extension assembly 102.

While the headrest extension assembly 102 is depicted as being movably couplable to the backrest assembly 104 via one or more ports, this is provided as an example for illustrative purposes. In this regard, the headrest extension assembly 102 may be movably couplable to the backrest assembly 104 in any manner known in the art including, but not limited to, one or more ports, one or more tracks, and the like.

In an embodiment, the one or more extension members 112 are coupled to an extension assist apparatus 106. The extension assist apparatus 106 may include any extension apparatus known in the art which may be configured to assert an extension force (or a component of an extension force) "upward" parallel to the movement axis 118. For example, the extension assist apparatus 106 may include a gas spring, a gas strut, or a mechanical strut. In some embodiments, the extension assist assembly 106 includes a damper configured to control the speed at which the headrest extension assembly 102 translates along the movement axis 118.

In another embodiment, the one or more extension members 112 may be coupled to the extension assist assembly 106 with one or more fasteners 122. Similarly, the extension assist apparatus 106 may be coupled to the backrest assembly 104 at an attachment point 126 via one or more fasteners 124. The one or more fasteners 122, 124 may include any fastening means known in the art configured to couple the extension assist assembly 106 to the one or more extension members 112 and the backrest assembly 104. For example, the one or more fasteners 122, 124 may include, but are not limited to, one or more screws, one or more nuts/bolts, one or more pins (e.g., hitch and pin, cotter pin, split pin, locking pin), one or more clamps, one or more adhesives, and one or more snaps. In some embodiments, the extension assist assembly 106 is coupled to a mounting bracket 128 affixed to the backrest assembly 104.

Although FIG. 1A depicts the extension assist assembly 106 as attaching to an attachment point 126 located on the backrest assembly 104, this is not to be regarded as a limitation of the present disclosure. The extension assist assembly 106 may be coupled to an attachment point 126 which is stationary with respect to the headrest extension assembly 102. For example, the extension assist assembly 106 may be coupled to an attachment point 126 which is located on the floor upon which the seat and backrest assembly 104 is situated. In another example, the extension assist assembly 106 may be coupled to an attachment point 126 which is located on a mounting bracket 128 which extends from the floor. In this regard, the extension assist assembly 106 may be coupled to any fixed point relative to the headrest extension assembly 102.

Similarly, while FIG. 1A illustrates the extension assist assembly 106 coupled directly to the one or more extension members 112 via one or more fasteners 122, this is not to be regarded as a limitation of the present disclosure, unless noted otherwise herein. In this regard, the extension assist assembly 106 may be coupled indirectly to the one or more extension members 112. For example, the extension assist assembly 106 may be coupled to a linking member which links the one or more extension members 112 together.

The extension assist assembly 106 may be configured to exert an extension force (or a component of an extension force) upon the headrest extension assembly 102 which is parallel with the movement axis 118. The extension force exerted by the extension assist assembly 106 may offset, or partially offset, an extension resistance force which acts parallel to the movement axis 118 in the opposite direction as the extension force. For example, referring to FIG. 1A, gravity may act as an extension resistance force, pulling the headrest down parallel (or substantially parallel) to the movement axis 118. Conversely, the extension assist apparatus 106 may exert an extension force upward parallel (or substantially parallel) to the movement axis 118 such that it offsets, or partially offsets, the force of gravity acting upon the mass of the headrest extension assembly 102. Offsetting, or partially offsetting, the extension resistance force may allow a passenger of an aircraft to extend the headrest extension assembly 102 with less force, thereby providing a smoother, more luxurious flying experience.

The extension force exerted by the extension assist assembly 106 may be based on a number of factors including, but not limited to, the force desired to extend the headrest extension assembly 102, and the magnitude of the extension resistance force, which may be affected by the mass of the headrest extension assembly 102, forces of friction, and the like. Accordingly, system 100 and extension assist assembly 106 may be tailored on a bespoke basis dependent on any number of factors including, but not limited to, the type of aircraft, particular passengers, desired flying experience, need for adjustability, frequency of adjustments, and the like. For example, the extension assist assembly 106 may be tailored such that the extension force is between two and five pounds less than the extension resistance force, such that only two to five pounds of force is required to extend the headrest extension assembly 102 from a retracted position to an intermediate or extended position.

As noted previously herein, the extension assist assembly 106 may include a gas spring. In embodiments, the extension assist assembly 106 (gas spring) may be loaded in compression, or may be loaded in extension. For example, FIGS. 1A and 1B illustrate an extension assist assembly 106 which may be loaded in compression.

FIG. 1B illustrates a rear view of an extension assist system 100 in an extended position, in accordance with one or more embodiments of the present disclosure. Generally speaking, FIG. 1A illustrates system 100 in a retracted position (e.g., stowed position), and FIG. 1B illustrates system 100 in an extended position.

Referring generally to FIGS. 1A and 1B for comparison, FIGS. 1A and 1B illustrate an extension assist assembly 106 which may be loaded in compression. In this example, a first end of the extension assist assembly 106 may be coupled to an extension member 112. A second end of the extension assist assembly 106 may be coupled to the backrest assembly 104 at an attachment point 126 located on the backrest assembly 104 substantially opposite the headrest extension assembly 102. In this example, when the extension assist assembly 106 is in a contracted/retracted state, the headrest extension assembly 102 may also be in a retracted position (e.g., stowed position), as shown in FIG. 1A. Conversely, as shown in FIG. 1B, when the extension assist assembly 106 is in an extended state, the headrest extension assembly 102 may also be in an extended state. The extension assist assembly 106, loaded in compression, may resist compression such that it exerts an extension force along the movement axis 118.

The inventive concepts of the present disclosure may be implemented in various environments to facilitate the movement of extendable components in relation to stationary components. In this regard, system 100 may be used in environments other than the headrest of a seat. For example, system 100 may be used to facilitate the movement of any extendable component, such as, but not limited to, a seat pan, a leg rest, a foot rest, or extensions of the same. For example, system 100 may be incorporated in a foot rest configuration. In this example, system 100 may include an "extension assembly 102" (instead of headrest extension assembly 102) and a "body assembly 104" (instead of backrest assembly 104). The extension assembly 102 may include an "extension panel 108" and one or more extension members 112. Therefore, although embodiments of the present disclosure are shown and described in the environment of an extendable headrest, it is contemplated that the inventive concepts disclosed herein may be used in other environments.

Figure 2A:
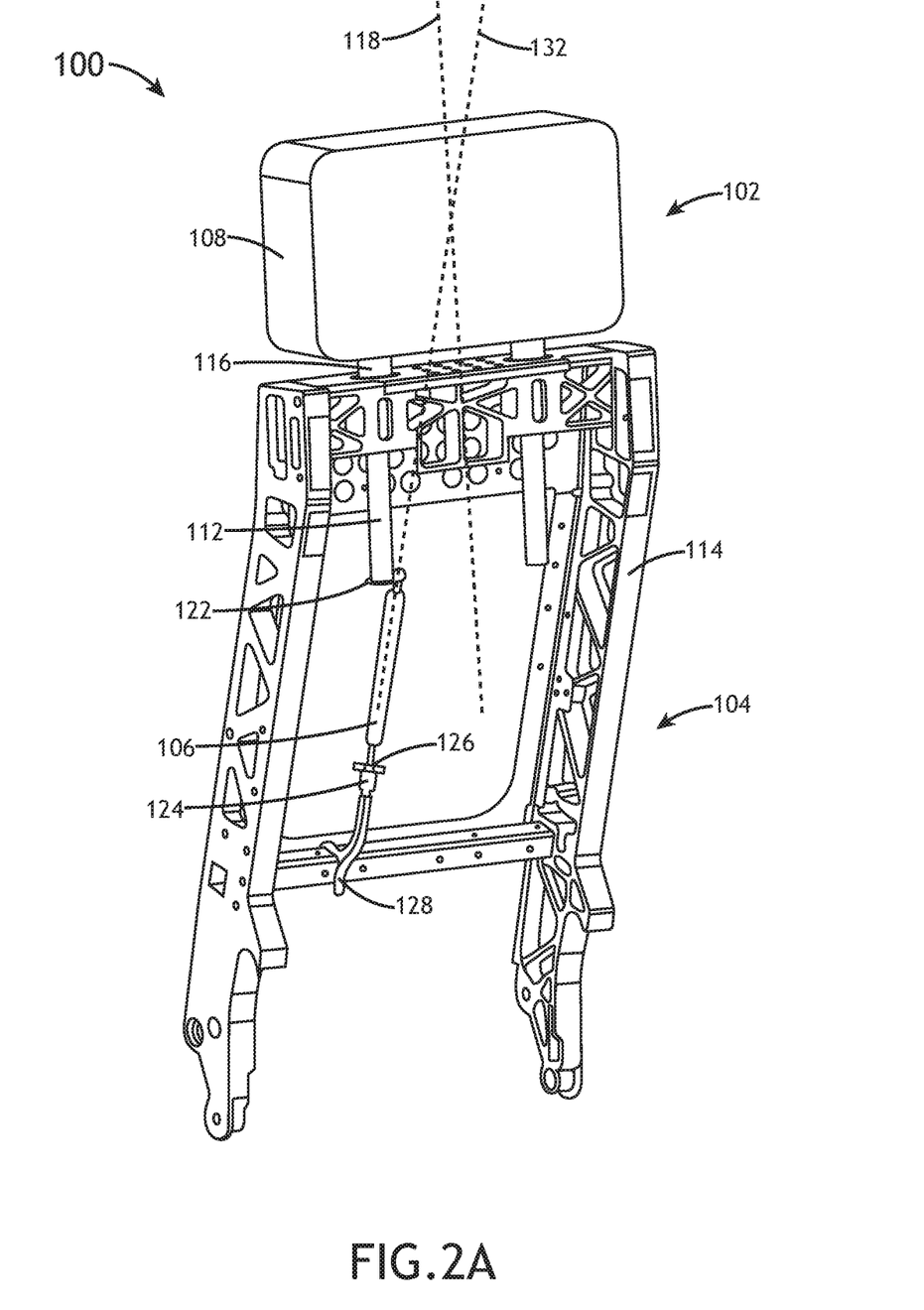
FIG. 2A illustrates a perspective view of an extension assist system in a retracted position, in accordance with an example embodiment of the present disclosure.
Figure 2B:
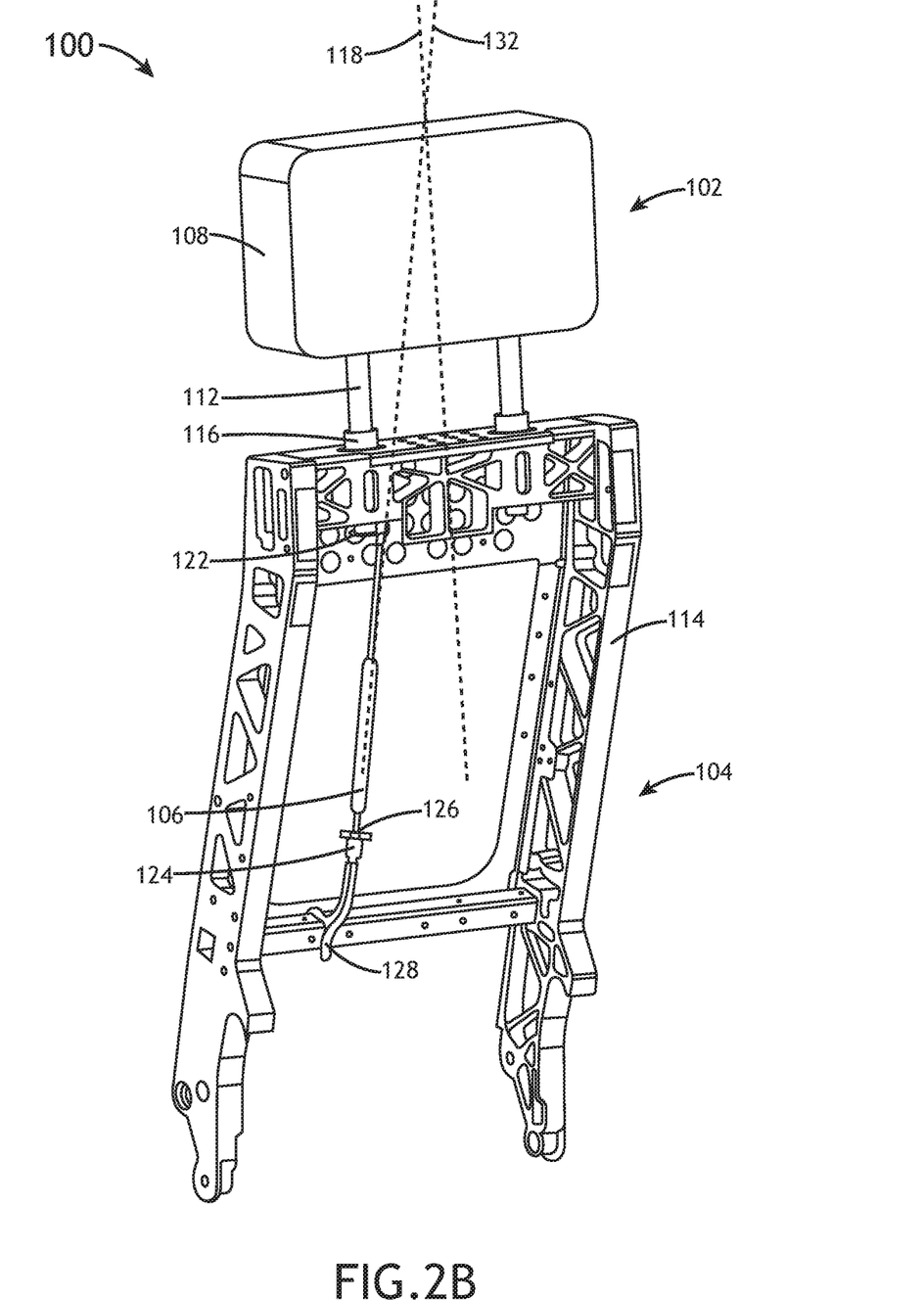
FIG. 2B illustrates a perspective view of an extension assist system in an extended position, in accordance with an example embodiment of the present disclosure.

FIG. 2A illustrates a perspective view of an extension assist system 100 in a retracted (stowed) position, in accordance with one or more embodiments of the present disclosure. FIG. 2B illustrates a perspective view of an extension assist system 100 in an extended position, in accordance with one or more embodiments of the present disclosure. As noted previously herein, system 100 may include a headrest extension assembly 102, a backrest assembly 104, and an extension assist assembly 106.

As stated previously, headrest extension assembly 102 may be coupled to the backrest assembly 104 such that the headrest extension assembly 102 may translate along the movement axis 118. In some embodiments, extension assist assembly 106 may be aligned along movement axis 118 such that the extension force exerted by the extension assist assembly 106 is parallel to the movement axis 118. In other embodiments, the extension assist assembly 106 may not be aligned along the movement axis 118. For example, as shown in FIGS. 2A and 2B, the extension assist assembly 106 may be positioned along an extension axis 132 which is different from the movement axis 118. In this regard, only a component of the extension force exerted by the extension assist assembly 106 may be parallel to the movement axis 118.

In embodiments where the extension assist assembly 106 is positioned along an extension axis 132 which is different from the movement axis 118, the relative angles between the extension axis 132 and the movement axis 118 may change as the headrest extension assembly 102 moves from a retracted position to an extended position, and vice versa. For instance, as shown in FIGS. 2A and 2B, the relative angles between the extension axis 132 and the movement axis 118 may vary when the headrest extension assembly 102 is in an extended or retracted position. Accordingly, in these embodiments, the one or more fasteners 122, 124 may be configured to couple the extension assist assembly 106 to the extension member 112 and the backrest assembly 104 at a number of different angles. In another example, the one or more fasteners 122, 124 may include a hitch and pin which may be configured to allow the extension assist assembly 106 to rotate relative to the extension member 112 as the headrest extension assembly 102 is translated along the movement axis 118.

Figure 3A:
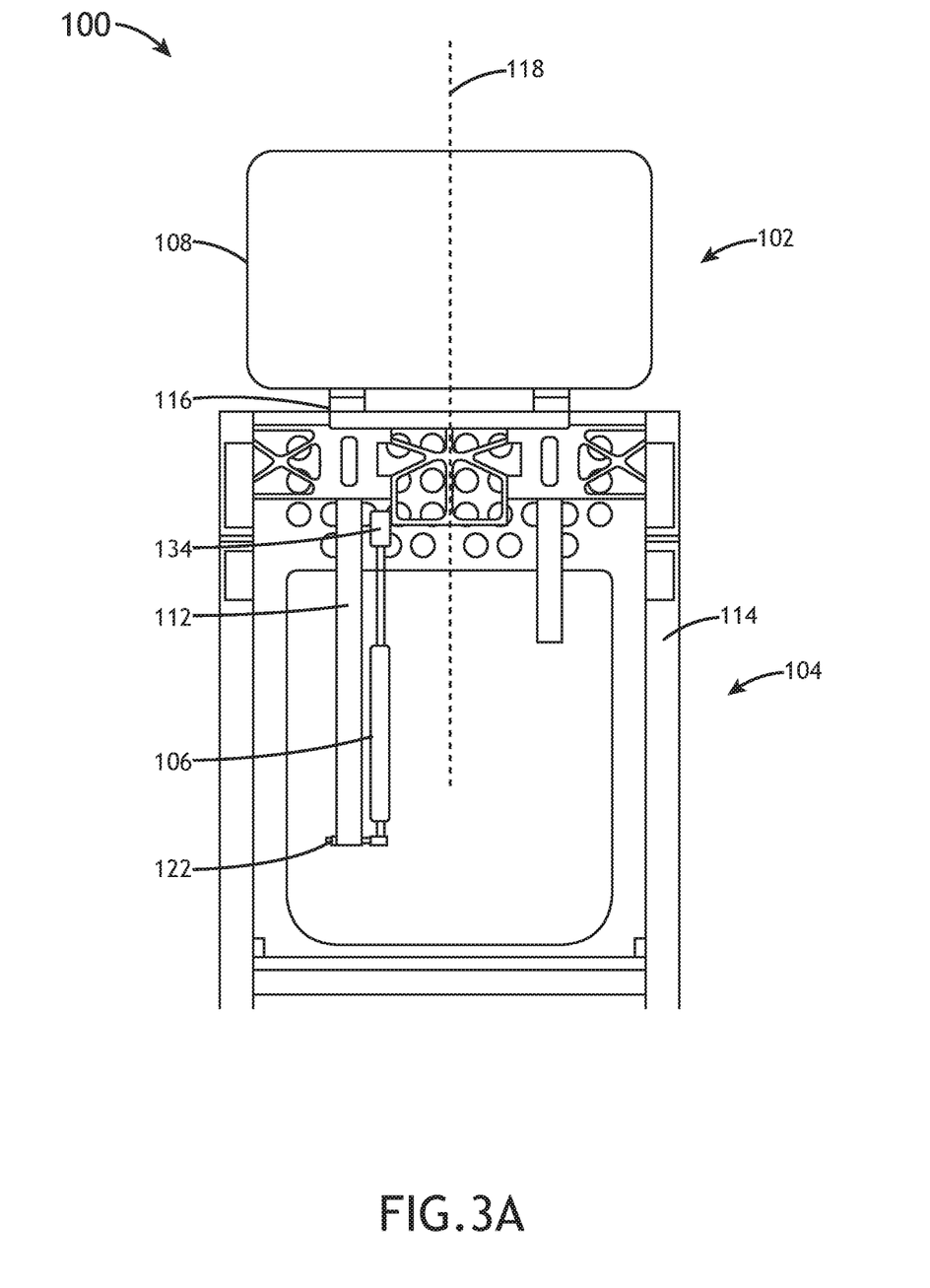
FIG. 3A illustrates a rear view of an extension assist system in a retracted position, in accordance with an example embodiment of the present disclosure.
Figure 3B:
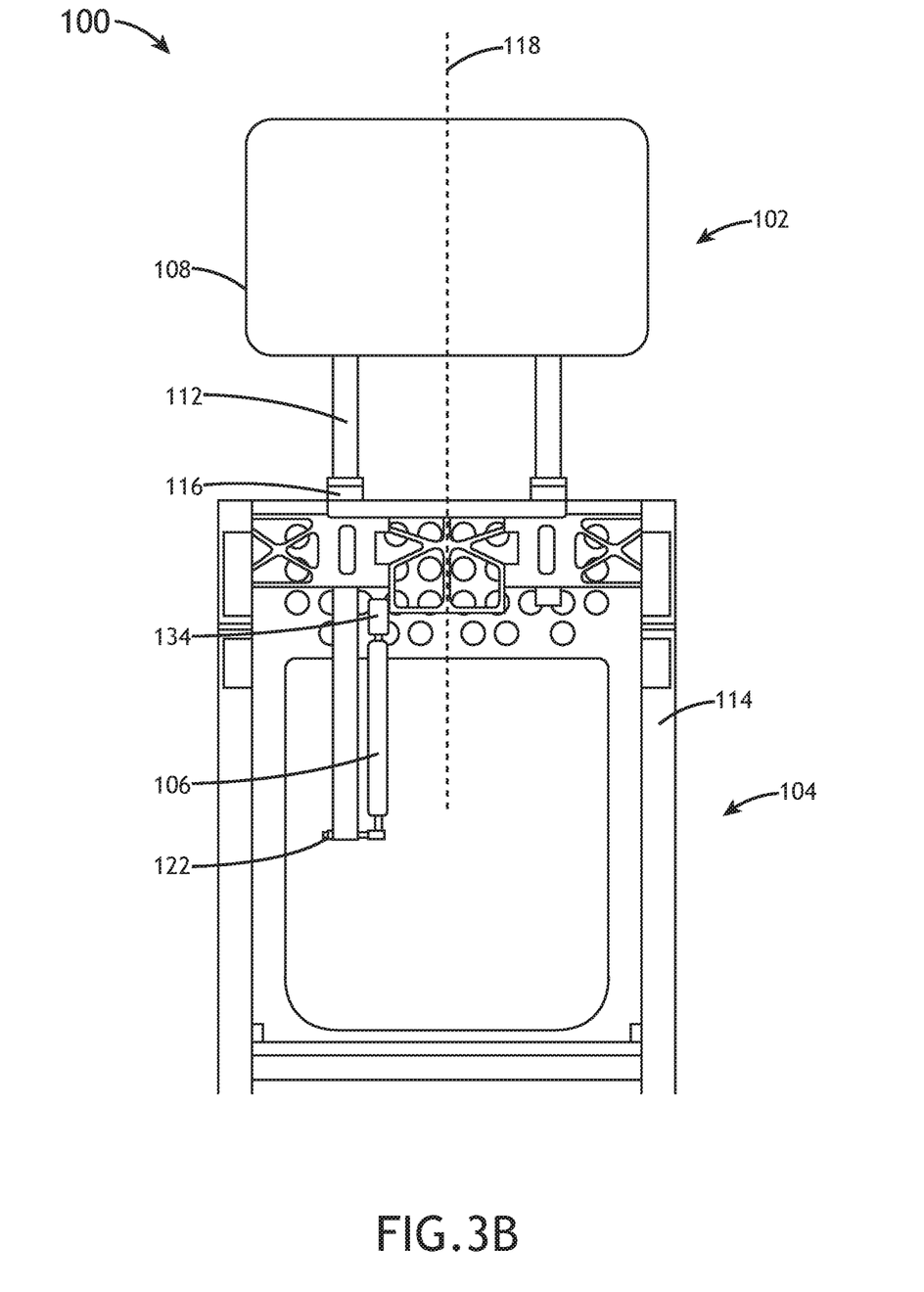
FIG. 3B illustrates a rear view of an extension assist system in an extended position, in accordance with an example embodiment of the present disclosure.

FIG. 3A illustrates a rear view of an extension assist system 100 in a retracted position, in accordance with one or more embodiments of the present disclosure. FIG. 3B illustrates a rear view of an extension assist system 100 in an extended position, in accordance with one or more embodiments of the present disclosure. As shown in FIGS. 3A and 3B, system 100 may include a headrest extension assembly 102, a backrest assembly 104, and an extension assist assembly 106.

In embodiments, a first end of the extension assist assembly 106 may be coupled to an extension member 112 via one or more fasteners 122. A second end of the extension assist assembly 106 may be coupled to the backrest assembly 104 at an attachment point 134. Comparing FIG. 3A and FIG. 1A, it can be seen that the extension assist assembly 106 may be coupled to the backrest assembly 104 at multiple points. For example, as shown in FIG. 1A, the extension assist assembly 106 is coupled to the backrest assembly 104 at attachment point 126 which is located on the backrest assembly 104 at a point which is substantially opposite the headrest extension assembly 102 and/or one or more ports 116. By further way of example, as shown in FIG. 3A, the extension assist assembly 106 is coupled to the backrest assembly 104 at attachment point 134 which is located on the backrest assembly 104 at a point which is proximate to the headrest extension assembly 102 and/or one or more ports 116.

As stated previously herein, the extension assist assembly 106 may include a gas spring. In embodiments, the extension assist assembly 106 (gas spring) may be loaded in compression, or may be loaded in extension. For example, FIGS. 3A and 3B illustrate an extension assist assembly 106 which may be loaded in extension.

Referring generally to FIGS. 3A and 3B for comparison, FIGS. 3A and 3B illustrate an extension assist assembly 106 which may be loaded in extension. In this example, a first end of the extension assist assembly 106 is coupled to an extension member 112. A second end of the extension assist assembly 106 is coupled to the backrest assembly 104 at attachment point 134 which is located on the backrest assembly 104 at a point which is proximate to the headrest extension assembly 102 and/or one or more ports 106. In this example, when the extension assist assembly 106 is in an extended state, the headrest extension assembly 102 is in a retracted position (e.g., stowed position), as shown in FIG. 3A. Conversely, as shown in FIG. 3B, when the extension assist apparatus 106 is in a retracted state, the headrest extension assembly 102 may be in an extended state. Accordingly, the extension assist assembly 106, loaded in extension, may resist extension such that it exerts an extension force along the movement axis 118.

Figure 4A:
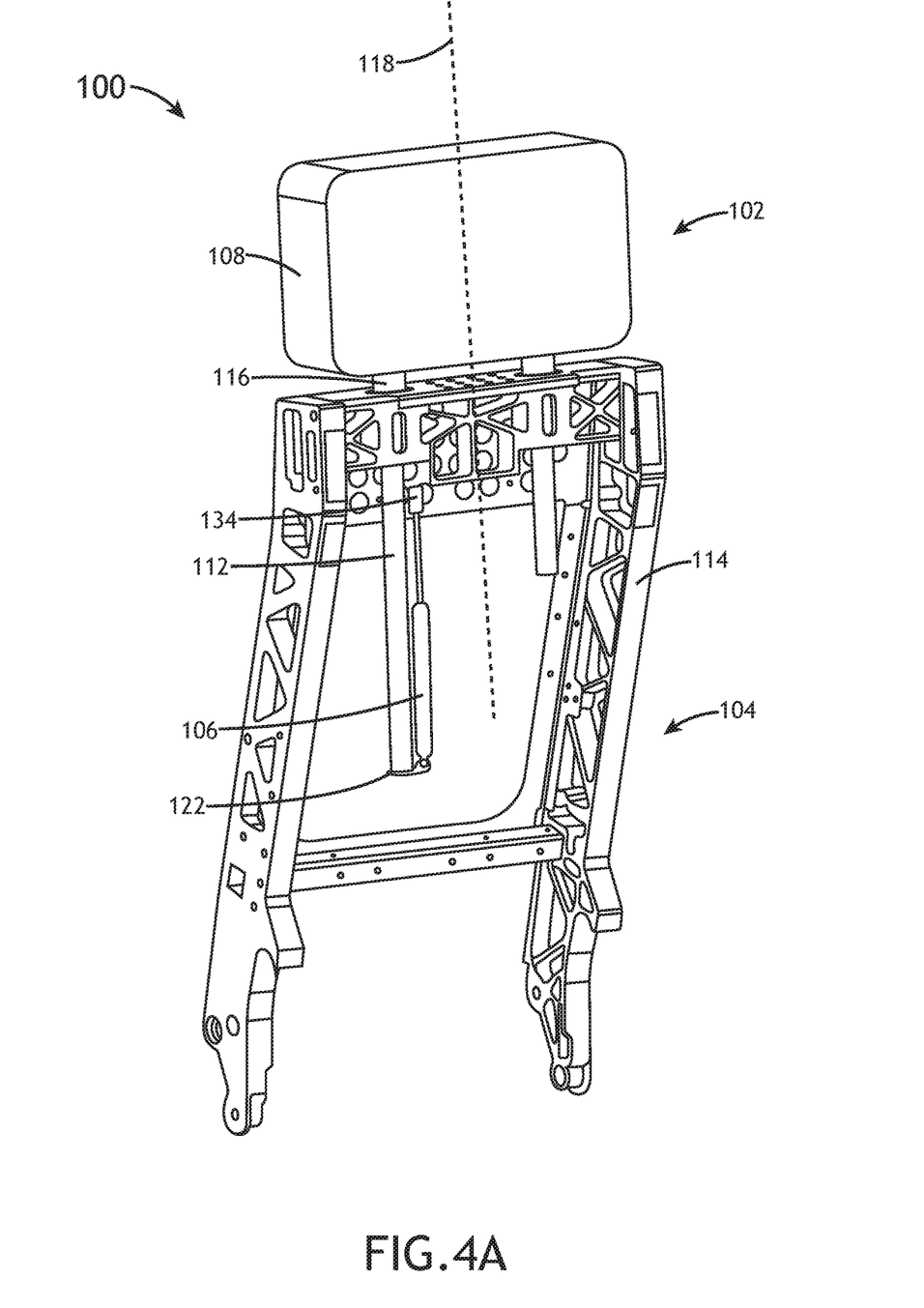
FIG. 4A illustrates a perspective view of an extension assist system in a retracted position, in accordance with an example embodiment of the present disclosure.
Figure 4B:
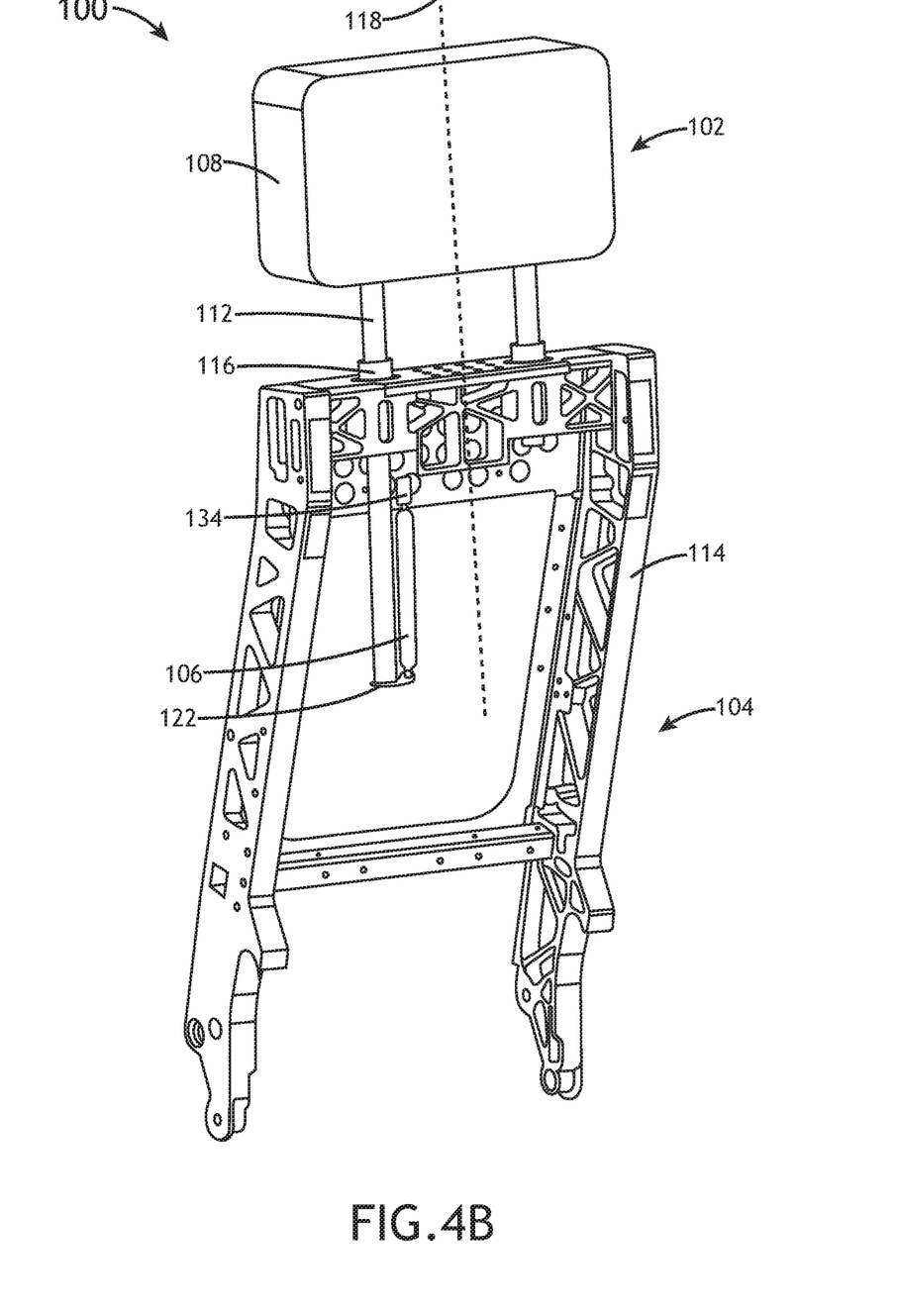
FIG. 4B illustrates a perspective view of an extension assist system in an extended position, in accordance with an example embodiment of the present disclosure.

FIG. 4A illustrates a perspective view of an extension assist system 100 in a retracted (stowed) position, in accordance with one or more embodiments of the present disclosure. FIG. 4B illustrates a perspective view of an extension assist system 100 in an extended position, in accordance with one or more embodiments of the present disclosure.

As shown in FIGS. 4A and 4B, in embodiments where the extension assist assembly 106 is coupled to the backrest assembly 104 at attachment point 134, the extension axis 132 and movement axis 118 may be parallel to one another. However, this is not to be regarded as a limitation on the scope of the present disclosure. In this regard, it is contemplated that extension assist assembly 106 may be coupled to the backrest assembly 104 at attachment point 134 located proximate to the one or more ports 116 such that the extension axis 132 and movement axis 118 are not parallel to one another.

Figure 5:
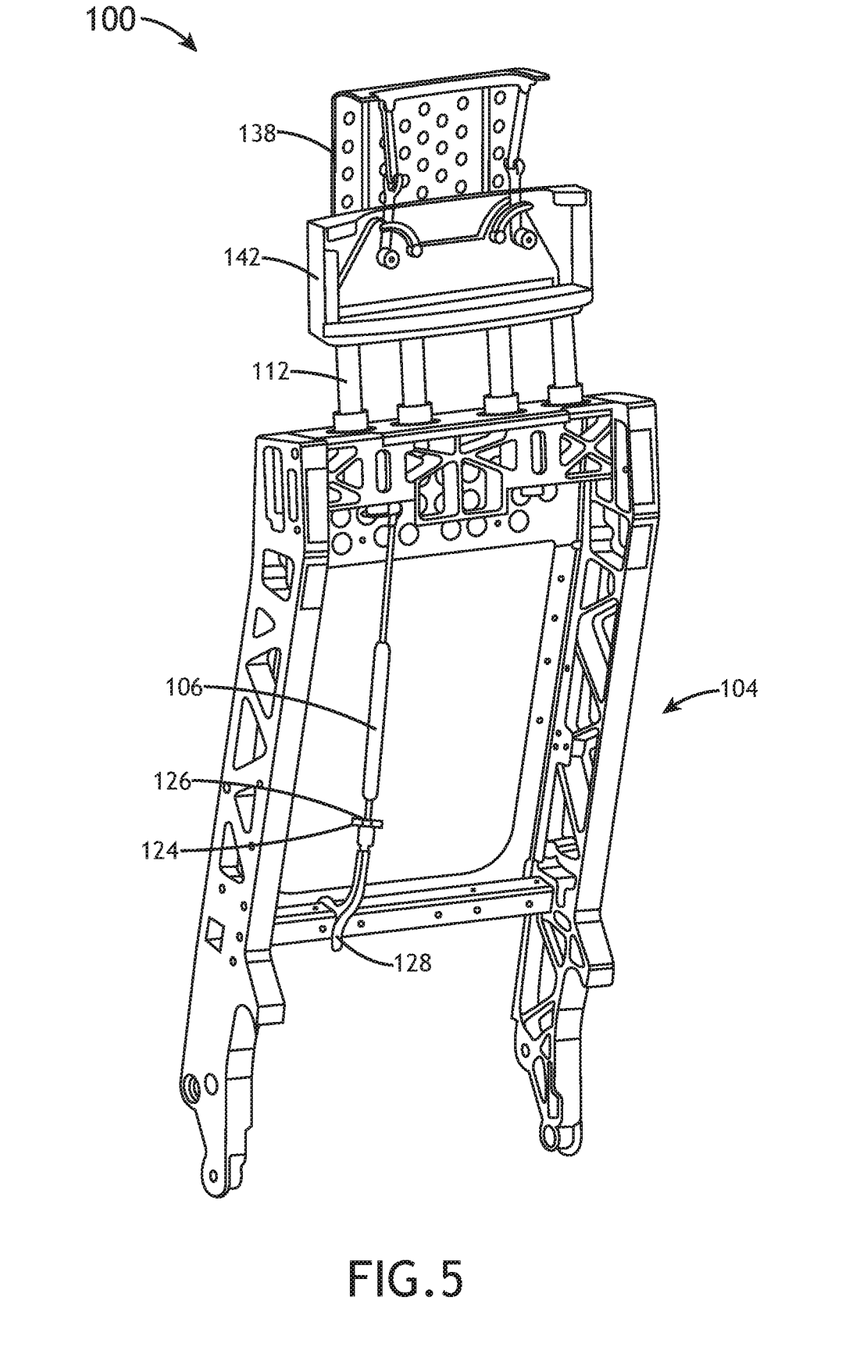
FIG. 5 illustrates a perspective view of an extension assist system including a backrest extension assembly and an extending headrest assembly, in accordance with an example embodiment of the present disclosure.

FIG. 5 illustrates a perspective view of an extension assist system 100 including a backrest extension assembly 142 and an extending headrest assembly 138, in accordance with one or more embodiments of the present disclosure. System 100 may include, but is not limited to, a backrest assembly 104, and an extension assist assembly 106, one or more extension members 112, a backrest extension assembly 142, an extending headrest assembly 138, and a means for extending the extending headrest assembly 138. System 100, as illustrated in FIG. 5, is described in more detail in U.S. Pat. No. 10,611,283 entitled "MULTI-STAGE SEATBACK EXTENSION SYSTEM" issued Apr. 7, 2020, both of which are incorporated herein by reference in their entirety.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or coupled with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. An extension assist system, comprising:
 a headrest extension assembly comprising a headrest and one or more extension members movably coupled to a backrest assembly of a seat, the headrest extension assembly configured to translate along a movement axis between at least a retracted position and an extended position; and
 an extension assist assembly with a first end and a second end, the first end coupled to the one or more extension members and the second end coupled to a fixed point relative to the headrest extension assembly, the extension assist assembly configured to exert an extension force parallel to the movement axis, the extension force configured to counter-balance a weight of the headrest extension assembly and facilitate movement of the headrest extension assembly by a user, wherein the extension force is less than an extension resistance force acting parallel to the movement axis in a direction opposite the extension force.

2. The extension assist system of claim 1, wherein the extension assist assembly comprises a gas spring assembly.

3. The extension assist system of claim 1, wherein the extension assist assembly is loaded in compression and is configured to extend to translate the headrest extension assembly from the retracted position to the extended position.

4. The extension assist system of claim 1, wherein the extension assist assembly is loaded in extension and is configured to retract to translate the headrest extension assembly from the retracted position to the extended position.

5. The extension assist system of claim 1, wherein the extension force is between two and five pounds less than the extension resistance force.

6. The extension assist system of claim 1, wherein the extension assist assembly is configured to extend along an extension axis that is parallel to the movement axis.

7. The extension assist system of claim 1, wherein the extension assist assembly is configured to extend along an extension axis that is not parallel to the movement axis.

8. An extension assist system, comprising:
an extension assembly comprising an extension panel and one or more extension members movably connected to a body assembly, the extension assembly configured to translate along a movement axis between at least a retracted position and an extended position; and
an extension assist assembly with a first end and a second end, the first end coupled to the one or more extension members and the second end coupled to a fixed point relative to the extension assembly, the extension assist assembly configured to exert an extension force parallel to the movement axis, the extension force configured to counter-balance a weight of a headrest extension assembly and facilitate movement of the headrest extension assembly by a user, wherein the extension force is less than an extension resistance force acting parallel to the movement axis in a direction opposite the extension force.

9. The extension assist system of claim 8, wherein the extension assist assembly comprises a gas spring assembly.

10. The extension assist system of claim 8, wherein the extension assist assembly is loaded in compression and is configured to extend along an extension axis to translate the extension assembly from the retracted position to the extended position.

11. The extension assist system of claim 8, wherein the extension assist assembly is loaded in extension and is configured to retract along an extension axis to translate the extension assembly from the retracted position to the extended position.

12. The extension assist system of claim 8, wherein the extension force is between two and five pounds less than the extension resistance force.

13. The extension assist system of claim 8, wherein the extension assist assembly is configured to extend along an extension axis that is parallel to the movement axis.

14. The extension assist system of claim 8, wherein the extension assist assembly is configured to extend along an extension axis that is not parallel to the movement axis.

15. An extension assist assembly for a seat headrest, comprising:
a gas spring assembly with a first end and a second end, the first end coupled to one or more extension members of a headrest extension assembly and the second end coupled to a fixed point relative to the headrest extension assembly, the gas spring assembly configured to exert an extension force along an extension axis, the extension force configured to translate the headrest extension assembly along a movement axis between at least a retracted position and an extended position, the extension force configured to counter-balance a weight of the headrest extension assembly and facilitate movement of the headrest extension assembly by a user, the extension force less than an extension resistance force acting parallel to the movement axis in a direction opposite the extension force.

16. The extension assist assembly of claim 15, wherein the gas spring assembly is loaded in compression and is configured to extend along the extension axis to translate the extension assembly from the retracted position to the extended position.

17. The extension assist assembly of claim 15, wherein the gas spring assembly is loaded in extension and is configured to retract along an extension axis to translate the extension assembly from the retracted position to the extended position.

18. The extension assist assembly of claim 15, wherein the extension force is between two and five pounds less than the extension resistance force.

19. The extension assist assembly of claim 15, wherein the gas spring assembly is configured to extend along the extension axis that is parallel to the movement axis.

20. The extension assist assembly of claim 15, wherein the gas spring assembly is configured to extend along an extension axis that is not parallel to the movement axis.

* * * * *